(12) United States Patent
Castor

(10) Patent No.: US 12,125,011 B2
(45) Date of Patent: Oct. 22, 2024

(54) FACILITATING DISPARATE CONVENIENCE SERVICES VIA A COMMON USER INTERFACE

(71) Applicant: Jon Castor, Woodside, CA (US)

(72) Inventor: Jon Castor, Woodside, CA (US)

(73) Assignee: Jon Castor, Woodside, CA (US)

( * ) Notice: Subject to any disclaimer, the term of this patent is extended or adjusted under 35 U.S.C. 154(b) by 599 days.

(21) Appl. No.: 17/000,103

(22) Filed: Aug. 21, 2020

(65) Prior Publication Data
US 2020/0394631 A1 Dec. 17, 2020

Related U.S. Application Data

(63) Continuation-in-part of application No. 15/723,574, filed on Oct. 3, 2017, now abandoned.

(51) Int. Cl.
| | |
|---|---|
| *G06Q 20/40* | (2012.01) |
| *G06Q 20/20* | (2012.01) |
| *G06Q 20/32* | (2012.01) |
| *H04L 67/306* | (2022.01) |
| *H04L 67/51* | (2022.01) |

(52) U.S. Cl.
CPC ........... *G06Q 20/20* (2013.01); *G06Q 20/325* (2013.01); *G06Q 20/40* (2013.01); *H04L 67/306* (2013.01); *H04L 67/51* (2022.05)

(58) Field of Classification Search
CPC ........ G06F 9/4443; G06F 3/048; G06F 17/60; G09B 7/00
See application file for complete search history.

(56) References Cited

U.S. PATENT DOCUMENTS

| | | | |
|---|---|---|---|
| 8,285,573 B1 * | 10/2012 | Ballaro | G06Q 10/087 705/5 |
| 9,924,861 B2 * | 3/2018 | Gonzalez Garcia | A61B 3/152 |
| 2003/0195838 A1 * | 10/2003 | Henley | G06Q 30/0249 705/37 |
| 2007/0121850 A1 * | 5/2007 | Klos | H04M 3/2263 379/114.28 |
| 2007/0179790 A1 * | 8/2007 | Leitch | G06Q 10/0633 705/7.27 |

(Continued)

*Primary Examiner* — Ariel Mercado-Vargas
(74) *Attorney, Agent, or Firm* — Steven Stupp

(57) ABSTRACT

During the operation, a computer receives, via a common user interface for different convenience services associated with providers, ordering information for an instance of a given convenience service in the convenience services, wherein the given convenience service includes a prespecified type of deliverable that is unchanged in different instances of the given convenience service. Moreover, the given convenience service includes providing the prespecified type of deliverable at a physical location of an individual. Then, the computer modifies the ordering information based at least in part on a predefined format. Next, the computer provides the modified ordering information to a given second computer in second computers associated with the providers, where the modified ordering information is provided via an application programming interface having the predefined format and associated with the given convenience service, and providing the modified ordering information orders the instance of the given convenience service.

21 Claims, 6 Drawing Sheets

(56) References Cited

U.S. PATENT DOCUMENTS

| | | | |
|---|---|---|---|
| 2011/0060728 A1* | 3/2011 | Sengupta | G06F 16/93 |
| | | | 707/E17.007 |
| 2011/0137745 A1* | 6/2011 | Goad | G06Q 30/0282 |
| | | | 705/26.9 |
| 2012/0141970 A1* | 6/2012 | Pompilio | G06F 9/453 |
| | | | 434/362 |
| 2014/0280966 A1* | 9/2014 | Sapuram | H04L 41/5054 |
| | | | 709/226 |
| 2015/0032477 A1* | 1/2015 | Duncan | G16H 10/60 |
| | | | 705/3 |

* cited by examiner

FACILITATING DISPARATE CONVENIENCE SERVICES VIA A COMMON USER INTERFACE

CROSS-REFERENCE TO RELATED APPLICATION

This application is a continuation-in-part of U.S. patent application Ser. No. 15/723,574, "Facilitating Services Using Capability-Based User Interfaces," filed on Oct. 3, 2017, by Michelle Bhatia, Jon Castor and Andrew G. Stevens, the contents of which is herein incorporated by reference.

BACKGROUND

Field

The described embodiments relate generally to a technique for enrolling and ordering instances of disparate convenience services using a common user interface provided by a different entity from the providers of the convenience services.

Related Art

Trends in connectivity and in portable electronic devices are resulting in dramatic changes in people's lives. For example, the Internet now allows individuals access to vast amounts of information, as well as the ability to identify and interact with individuals, organizations and companies around the world. This has resulted in a significant increase in online financial transactions (which are sometimes referred to as 'ecommerce'). Similarly, the increasingly powerful computing and communication capabilities of portable electronic device (such as smartphones and tablets), as well as a large and growing set of applications, are accelerating these changes, providing individuals access to information at arbitrary locations and the ability to leverage this information to perform a wide variety of tasks.

However, the technologies that form the basis of these dramatic changes are often daunting or inaccessible to many potential users. For example, senior citizens are often intimidated by these technologies (which are relatively new innovations). In addition, many of these technologies do not take into account the cognitive and/or physical changes associated with aging. Therefore, many seniors have difficulty in using the applications on smartphones and/or websites on the Internet. Consequently, many senior citizens and other affected populations are often unable to benefit from the advantages provided by portable electronic devices and the Internet.

SUMMARY

A first group of embodiments relates to a computer that performs an enrollment process and provides an ordering process. This computer includes: an interface circuit that communicates with one or more electronic devices, a processor, and memory that stores a program module. When executed by the processor, the program module causes the computer to perform the enrollment process and to provide the ordering process. In particular, during the enrollment process, the computer provides first user-interface information for a first electronic device that specifies an enrollment user interface associated with first individual characteristics. In response, the computer receives first user-interface activity associated with the first electronic device that specifies enrollment information for a service. Then, the computer provides the enrollment information for a second computer associated with the service. Subsequently, the computer provides the ordering process. In particular, during the ordering process, the computer provides second user-interface information for a second electronic device that specifies a service user interface associated with second individual characteristics. In response, the computer receives second user-interface activity associated with the second electronic device that specifies a request for an instance of the service. Then, the computer provides the request for the instance of the service for the second computer.

Note that the first individual characteristics may be associated with a first type of individual that is more experienced or savvy in using technology than a second type of individual associated with the second individual characteristics. For example, the second type of individual may be a senior citizen. Alternatively, the first type of individual may be a peer of the second type of individual (e.g., approximately the same age), but that is more facile or comfortable in using technology than the second type of user, or may be a concierge or a professional that assists the second type of individual as part of the enrollment process associated with the computer. More generally, the second type of individual may have different capabilities or preferences than the first type of individual. In some embodiments, the second type of individual has different physical, mental or learning capabilities than the first type of individual.

Moreover, the providing of the enrollment information may involve establishing an account for the service.

Furthermore, the service may be associated with a third party that is different from a provider of the enrollment process and the ordering process.

Additionally, the first user-interface activity may specify enrollment information for a second service, and the computer may provide the enrollment information for a third computer associated with the second service. Thus, the enrollment process may allow or facilitate enrollment in multiple services, which may be associated with one or more service providers. Moreover, the enrollment process may be performed once, while the service process may be performed multiple times.

In some embodiments, relative to the enrollment user interface, the service user interface has: a larger font size, a slower refresh rate, a longer timeout interval, displays information closer to a center of a display, a larger strike area associated with a virtual command icon based on hand jitter, different contrast, simplified inputs, simplified navigation, easier error recovery, text information to guide use of the service user interface, and/or acoustic information to guide use of the service user interface.

Note that the service user interface may be based on the different capabilities or a learning style of the second type of individual (e.g., the second characteristics may reflect the capabilities or learning style of the second type of individual). Alternatively, or additionally, the service user interface may be based on technical risk aversion of the second type of individual.

While the enrollment user interface and the service user interface may be different in the aforementioned ways, they may be used by different individuals (such as a first individual, a second individual, an administrator, a dependent individual, etc.) or the same individual.

Other embodiments provide a computer-readable storage medium for use with the computer, the first electronic device or the second electronic device. When executed by the computer, the computer-readable storage medium may cause the computer to perform at least some of the aforementioned operations of the computer, the first electronic device or the second electronic device.

Other embodiments provide a method for performing the enrollment process and providing the ordering process. The method includes at least some of the aforementioned operations performed by the computer, the first electronic device or the second electronic device.

A second group of embodiments relates to a computer that provides a single user interface that can be used for an enrollment process and an ordering process. This user interface may allow one or more individuals to enroll and to use different services from one or more service providers.

Other embodiments provide a computer-readable storage medium for use with the computer, a first electronic device or a second electronic device. When executed by the computer, the computer-readable storage medium may cause the computer to perform at least some of the aforementioned operations of the computer, the first electronic device or the second electronic device.

Other embodiments provide a method for performing the enrollment process and providing the ordering process. The method includes at least some of the aforementioned operations performed by the computer, the first electronic device or the second electronic device.

A third group of embodiments relates to a computer that allows a first type of individual to mirror or duplicate enrollment information and/or configuration information associated with an account of the first type of individual for an account of a second type of individual, which may allow one or more individuals to enroll and to use different services from one or more service providers.

Other embodiments provide a computer-readable storage medium for use with the computer, a first electronic device or a second electronic device. When executed by the computer, the computer-readable storage medium may cause the computer to perform at least some of the aforementioned operations of the computer, the first electronic device or the second electronic device.

Other embodiments provide a method for performing the enrollment process and providing the ordering process. The method includes at least some of the aforementioned operations performed by the computer, the first electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
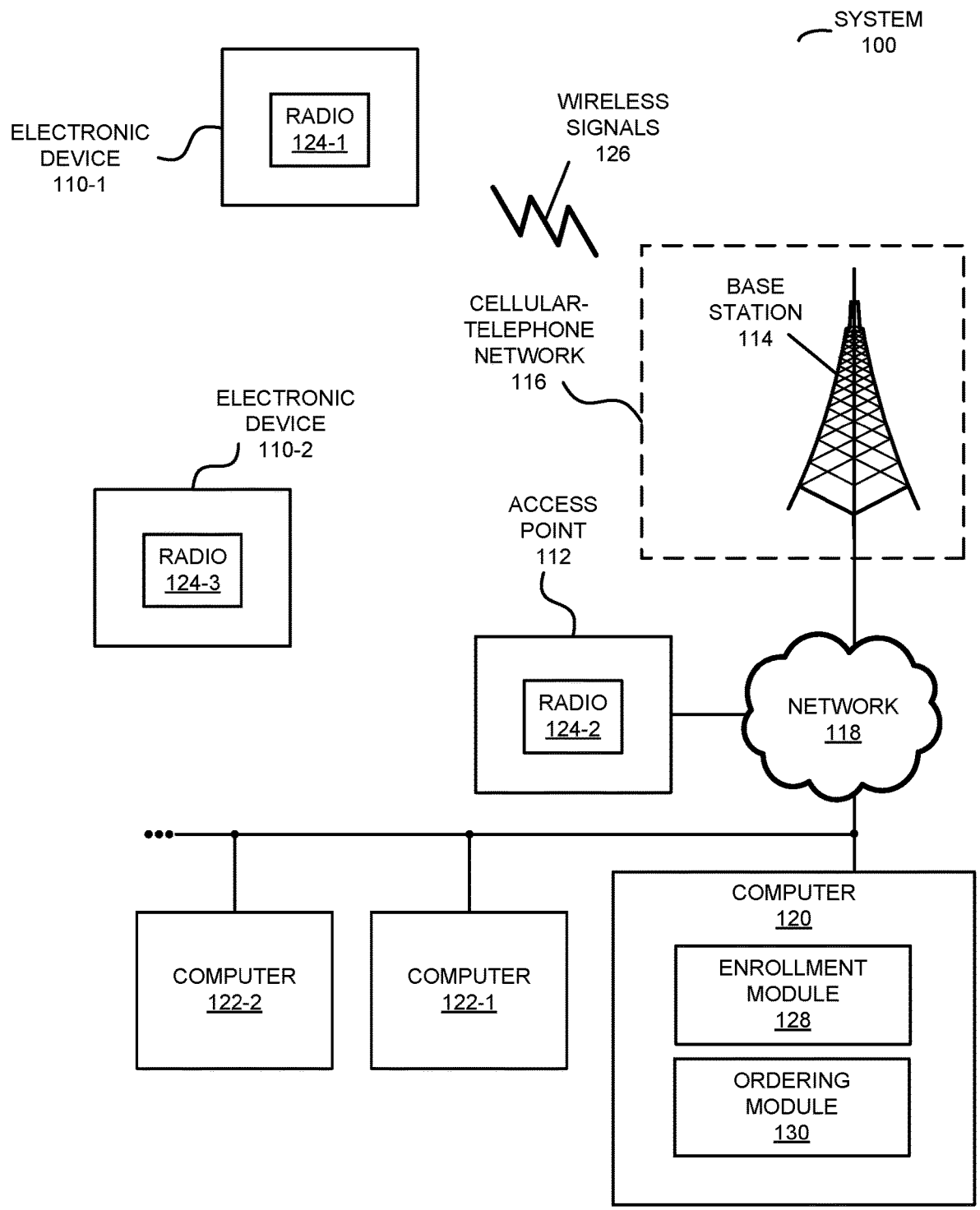
FIG. 1 is a block diagram illustrating electronic devices communicating in accordance with an embodiment of the present disclosure.

A computer that performs an enrollment process and provides an ordering process is described. During the enrollment process, the computer provides first user-interface information for a first electronic device that specifies an enrollment user interface associated with first individual characteristics. In response to receiving first user-interface activity that specifies enrollment information for a service, the computer provides the enrollment information to a second computer associated with the service. Subsequently, during the ordering process, the computer provides second user-interface information that specifies a service user interface associated with second individual characteristics. For example, the first individual characteristics may be associated with a first type of individual that is more experienced or savvy in using technology than a second type of individual associated with the second individual characteristics. In response to receiving second user-interface activity that specifies a request for an instance of the service, the computer provides the request for the instance of the service to the second computer.

By separating the enrollment process and the ordering process, these access techniques may allow the enrollment user interface and the service user interface to be tailored to the needs (and, in particular, the cognitive and/or physical capabilities) of different individuals. In this way, an adult or a care provider can perform the enrollment process, while a senior citizen or an individual with different physical, mental or learning capabilities (such as a handicap or a disability) can perform the ordering process. Moreover, the access techniques may allow a common and user-friendly service user interface to be used to order services from a variety of third-party service providers. Consequently, the access techniques may facilitate use of one or more services (such as car transportation, ride-hailing applications, take-out, prepared meals, food delivery, a payment service, shopping, ecommerce, safe communication, home healthcare, etc.) by individuals in populations that typically have difficulty in accessing these services. In turn, by facilitating the use of such services, the access techniques may improve the mobility and quality of life of these individuals, thereby enhancing customer satisfaction with the access techniques.

In the discussion that follows, an individual or a user may be a person. Also, or instead, the access techniques may be used by any type of organization, such as a business, which should be understood to include for-profit corporations, non-profit corporations, groups (or cohorts) of individuals, sole proprietorships, government agencies, partnerships, etc.

Moreover, in the discussion that follows, the computer and/or electronic devices may communicate using a wide variety of communication protocols. For example, the communication may involve wired and/or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Texas), Bluetooth® (from the Bluetooth Special Interest Group of Kirkland, Washington), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet and Wi-Fi are used as illustrative examples.

Communication among electronic devices is shown in FIG. 1, which presents a block diagram illustrating an example of a system 100 that performs the enrollment process and provides the ordering process. In particular, system 100 includes one or more electronic devices 110 (such as a smartphone, a laptop computer, a notebook computer, a tablet, or another such electronic device) and optional access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device.

Moreover, system 100 includes optional base station 114 in cellular-telephone network 116. In some embodiments, one of electronic devices 110 (such as electronic device 110-1) communicates with base station 114 (and, thus, cellular-telephone network 116) using a cellular-telephone communication protocol.

Using access point 112 and/or cellular-telephone network 116, electronic devices 110 may communicate, via network 118 (such as the Internet), with remote computers and servers, such as computer 120 (which provides the access techniques) and/or one or more of computers 122 (which are associated with services offered by one or more third parties, such as car transportation, food delivery, ecommerce, etc.).

Figure 7:
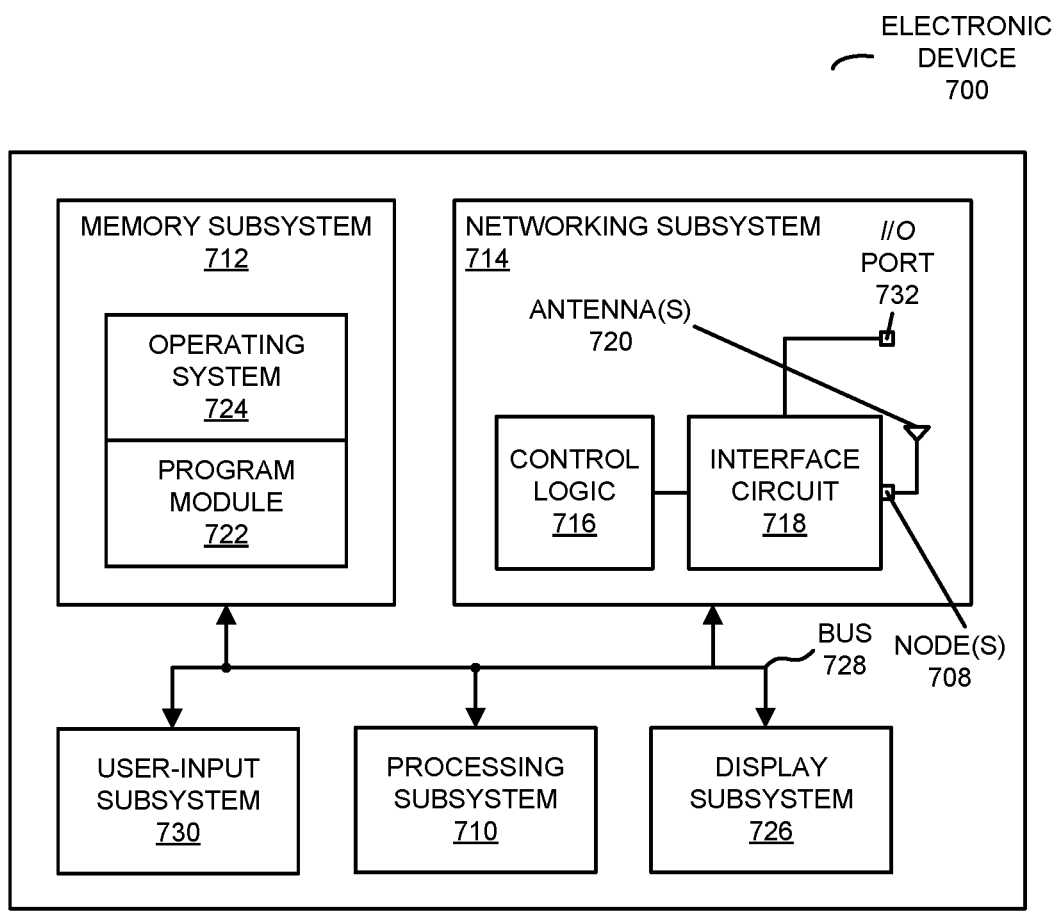
FIG. 7 is a block diagram illustrating an example of one of the electronic devices of FIG. 1 in accordance with an embodiment of the present disclosure.

As described further below with reference to FIG. 7, the one or more electronic devices 110, access point 112, base station 114, and/or computer 120 may include subsystems, such as a networking subsystem, a memory subsystem and a processor subsystem. In addition, the one or more electronic devices 110, optional access point 112, and/or optional base station 114 may include radios 124 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 126 (represented by jagged lines) are transmitted by radios 124 in the components. For example, radio 124-1 in electronic device 110-1 may transmit information (such as packets or frames) using wireless signals 126. These wireless signals may be received by radios 124 in one or more of the other components, such as by access point 112 or base station 114. This may allow electronic device 110-1 to communicate information with access point 112 or base station, and thus, to computer 120.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the user-interface information, user-interface activity, associated data, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, many prospective users or individuals are intimated by or unable to use the technologies that are driving large-scale changes in society. For example, because of cognitive and/or physical changes, senior citizens are often unable to use the user interfaces on smartphone applications of Internet websites, which are often not developed with their capabilities or preferences in mind. Similar challenges affect other potential users or individuals that have physical or mental handicaps or learning disabilities (which are sometimes referred to as 'handicaps'), and more generally different physical, mental or learning capabilities or preferences.

In order to address these challenges and to facilitate increased use of online services that are typically provided via smartphones or websites, computer 120 may implement the access techniques. In particular, as described further below with reference to FIGS. 2-4, during the enrollment process in the access techniques a first individual using electronic device 110-1 (such as the adult offspring of a senior citizen, an adult that is caring for a child, a care provider or administrator for a second individual, e.g., an individual with a disability, etc.) may launch a first application installed on electronic device 110-1 or may access, via network 118, computer 120 (such by providing a network address, e.g., a URL, of computer 120). In response, enrollment module 128 on computer 120 may provide, via network 118, first user-interface information for electronic device 110-1 that specifies an enrollment user interface associated with first individual characteristics. Note that the first individual characteristics may be associated with a first type of individual (such as the first individual) that has cognitive and/or physical capabilities that exceed one or more thresholds and, more generally, that are associated with a particular classification (such as users that have good visual acuity, good color vision, strong fine-motor capability, who are willing to use new technology or services, who are comfortable with or less capable in exploring or navigating through new information, who have flexible learning strategies, who are comfortable, experienced or savvy in using technology, etc.).

After receiving the enrollment user interface, electronic device 110-1 may display the enrollment user interface. The first individual may interact with the enrollment user interface to specify enrollment information needed to enroll the second individual for one or more services (such as a service) provided by one or more third-party service providers (such as a third-party service provider). This enrollment information may include account information (such as credentials, e.g., a username and a password, one or more addresses where services may be provided, contact information, etc.), health information of the second individual (such as information that specifies a medical condition, special medical needs of the second individual, healthcare-provider information, etc.), preferences (such as usability settings, privacy, service-usage constraints) and/or financial information (such as a credit-card or debit-card number and, more generally, payment information). Electronic device 110-1 may provide, via network 118, the enrollment information (and, more generally, information that specifies first user-interface activity) to computer 120. Then, computer 120 may provide, via network 118, the enrollment information to one of computers 122 (such as computer 122-1). This may set up an account for the service with computer 122-1, such as an account for the first individual and/or the second individual. Note that the first individual may repeat the enrollment process multiple times in order to set up accounts for different services that are provided by one or more third-party service providers, and which are hosted on one or more of computers 122. Alternatively, the enrollment process may allow the first individual to enroll concurrently for different services that are provided by one or more third-party service providers, which may allow the enrollment process to be performed once. Thus, in either of these embodiments, the first user-interface activity may specify enrollment information for a second service, and computer 120 may provide, via network 118, the enrollment information to another one of computers 122 (such as computer 122-2) that is associated with the second service.

In some embodiments, the first individual functions as an 'administrator' for the second individual, thereby providing help or assistance for the second individual (who may have additional need for assistance in navigating and setting up accounts, etc.). As described further below, for security purposes, the first individual may hide or obfuscate the financial information and/or the health information during the enrollment process, and may provide such sensitive information when contacted directly or following two-factor authentication. During the enrollment process, the first individual may also perform training for the second individual on features associated with a particular service and/or may tailor or specify the specific features or configuration of a service user interface for the second individual.

After the enrollment process is completed, the second individual (such as a senior citizen, an individual older than age 60, 65 or 70, an individual with different physical, mental or learning capabilities or preferences than the first individual, an individual with a physical handicap, a mental handicap, a learning disability, a child or ward with a disability, etc.) may use the same or another electronic device (such as electronic device 110-2) to access or order one of the services. In particular, during the ordering process in the access techniques, the second individual may launch a second application installed on electronic device 110-2 or may access, via network 118, computer 120 (such by providing the network address, e.g., the URL, of computer 120). Note that the second application may be the same as or different than the first application.

In response, ordering module 130 on computer 120 may provide, via network 118, second user-interface information for electronic device 110-2 that specifies the service user interface associated with second individual characteristics. Note that the second individual characteristics may correspond to cognitive/mental and/or physical capabilities that are less than one or more thresholds (such as reduced or impaired short-term memory, episodic memory and/or prospective memory) and, more generally, that are associated with a particular classification (such as users that have reduced visual acuity or color vision, reduced fine-motor capability, who are less willing to use new technology or services, who are less comfortable with or adroit in exploring or navigating through new information, who have less flexible learning strategies, who are less comfortable, experienced or savvy in using technology, who have a different attitude or knowledge that the first type of user, etc.). Moreover, as described further below with reference to FIGS. 5 and 6, relative to the enrollment user interface, the service user interface may be tailored to the needs, capabilities or preferences of the second individual.

After receiving the service user interface, electronic device 110-2 may display the service user interface. The second individual may interact with the service user interface to specify service information needed to request an instance of a service provided by a third-party service provider (and, more generally, one of multiple services provided by one or more third-party service providers). This service information may include an identifier of the service, a location where the service is to be provided, an identifier of or information that specifies a product that is to be delivered, etc. Electronic device 110-2 may provide, via network 118, the service information (and, more generally, information that specifies second user-interface activity) to computer 120. Then, computer 120 may provide, via network 118, the service information to one of computers 122 (such as computer 122-1).

Note that the second individual may repeat the ordering process multiple times in order to access or request instances of one or more services provided by the one or more third-party service providers, and which are hosted on or associated with one or more of computers 122. However, instead of being forced to interact with or navigate multiple different user interfaces for these services, the second individual may use the service user interface provided by computer 122. Therefore, computer 120, which may be associated with a different provider than the third-party service providers, may provide a common and, thus, a familiar environment for requesting the one or more services.

In some embodiments, the first individual is included in a portion of the ordering process. For example, the first individual may be requested to approve service requests or outbound payments of the second individual. Thus, computer 120 may provide, via network 118, an authorization message to electronic device 110-1, and in response may receive an authorization response from electronic device 110-1 (which may include two-factor authentication of the first individual). Alternatively, or additionally, during the enrollment process, the first individual may define or may approve a 'whitelist' of preapproved services, locations and/or transactions, such as specific types of meals/products that can be ordered, content that can be viewed, trips to certain locations (e.g., healthcare providers, friends, family, etc.). Similarly, during the enrollment process the first individual may define or approve a 'blacklist' of declined services, such as an online or a physical casino if the second person has a gambling addiction, or an online or a physical liquor store or pharmacy if the second person has a dependency on alcohol or a prescription medication. Whitelisting a location once during the enrollment process would enable the second individual to do what they wanted without feeling that they need to always ask permission (or feel like they are being tracked) by the first individual, which can have negative emotional consequences (such as making the second individual feel that they are a burden by asking for permission or help). Thus, the administrator role of the first individual in the access techniques may be subtle, but powerful.

In some embodiments, the first individual can view a log of the activity of the second individual in order to monitor their activities, and the system can detect patterns or changes in patterns and alert the first individual. For example, if the second individual was using their unlimited travel privileges intended for travel to a grocery store, but instead was going to a backlisted liquor store next door, the pattern may be detected, such as by using geofencing and/or by sharing the monitored location of the second individual over time with the first individual. In this case, the first individual may subsequently blacklist a previously whitelisted location, and may select one or more alternative whitelisted location where the second individual has unlimited travel privileges.

In this way, the access techniques may allow the first individual to perform tasks (such as setting up one or more accounts) that are more difficult for the second individual, and may provide a service user interface that encourages or facilitates the second individual to use the one or more services. In particular, the access techniques may allow the first individual to perform a one-time enrollment process (for one or more services) that enables the second individual to order one or more services one or more times (such as multiple, different instances of a service). This separate onboarding and ordering allows the associated user interfaces to be optimized based on individual needs, capabilities and/or preferences, and allows a 'one click' or simplified user experience. In addition, the access techniques may facilitate unified billing for multiple services, which may be handled by the provider of the access techniques. More generally, the access techniques may allow individuals with different characteristics and capabilities to cooperate more effectively to allow a first type of individual to assist the second type of individual. Consequently, the access techniques may make it easier for the first individual to help care or provide for the second individual, and may improve the mobility and quality of life of the first individual. As noted previously, the first individual may function as an 'administrator' for the second individual, providing advice, suggestions, teaching and/or training, thereby allowing the second individual to 'discover' and use one or more services that can benefit the second individual.

While the enrollment user interface and the service user interface may be different in the aforementioned ways, they may be used by different individuals (such as the first individual, the second individual, an administrator, a dependent individual, etc.) or the same individual.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
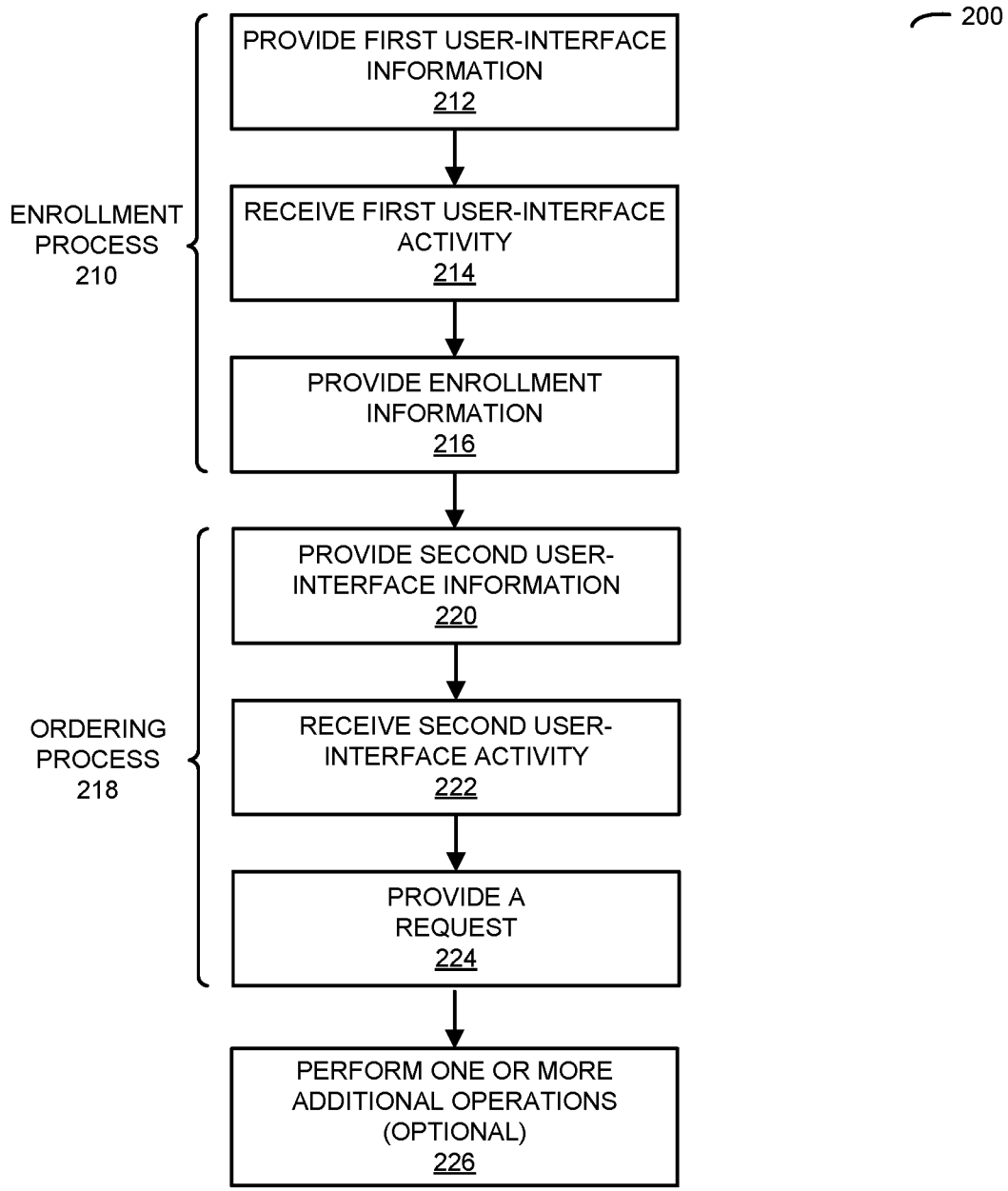
FIG. 2 is a flow diagram illustrating a method for performing an enrollment process and providing an ordering process using a computer in FIG. 1 in accordance with an embodiment of the present disclosure.

FIG. 2 presents embodiments of a flow diagram illustrating an example of a method 200 for performing an enrollment process and providing an ordering process, which may be performed by a computer (such as computer 120 in FIG. 1). During operation, the computer may perform an enrollment process 210. In particular, the computer may provide first user-interface information (operation 212) for a first electronic device that specifies an enrollment user interface associated with first individual characteristics. In response, the computer may receive first user-interface activity (operation 214) associated with the first electronic device that specifies enrollment information for a service. Then, the computer may provide the enrollment information (operation 216) for a second computer associated with the service. Note that the service may be associated with a third party (such as a third-party service provider) that is different from a provider of the enrollment process and the ordering process.

Subsequently, the computer provides the ordering process 218. In particular, the computer may provide second user-interface information (operation 220) for a second electronic device that specifies a service user interface associated with second individual characteristics. Note that the first individual characteristics may be associated with a first type of individual that is more experienced or savvy in using technology than a second type of individual associated with the second individual characteristics. For example, the second type of individual may be a senior citizen. Alternatively, the first type of individual may be a peer of the second type of individual (e.g., approximately the same age, such as within 10 years of age as the second type of individual), but that is more facile or comfortable in using technology than the second type of user, or may be a concierge or a professional than assists the second type of individual as part of the enrollment process associated with the computer (e.g., the concierge may be associated with a provider of the enrollment process, such as a contractor or an employee). More generally, the second type of individual may have different capabilities than the first type of individual. In some embodiments, the second type of individual has different physical, mental or learning capabilities or preferences than the first type of individual. In some embodiments, relative to the enrollment user interface, the service user interface has: a larger font size, a slower refresh rate, a longer timeout interval, displays information closer to a center of a display, a larger strike area associated with a virtual command icon based on hand jitter, different contrast, simplified inputs, simplified navigation, easier error recovery, special notifications, special reminders, special alarms, text information to guide an individual in using the service user interface, and/or acoustic information to guide the individual in using the service user interface. Note that the service user interface may be based on a learning style of the second type of individual. Alternatively, or additionally, the service user interface may be based on technical risk aversion of the second type of individual.

In response, the computer may receive second user-interface activity (operation 222) associated with the second electronic device that specifies a request for an instance of the service. Then, the computer may provide the request (operation 224) for the instance of the service for the second computer.

In some embodiments, the computer optionally performs one or more additional operations (operation 226). For example, the providing of the enrollment information (operation 216) may involve establishing an account for the service. Alternatively, or additionally, the first user-interface activity may specify enrollment information for a second service, and the computer may provide the enrollment information for a third computer associated with the second service.

In embodiments where the first type of individual is a concierge or a professional, information learned about the enrollment process may subsequently be used to at least partially automate the enrollment process. Thus, initially, there may be a first type of individual (such as a concierge). However, subsequently or over time, the role of the first type of individual may be reduced or eliminated and replaced by software that performs some or all of their function. Moreover, note that during the enrollment process, the enrollment user interface may collect information for multiple services. For example, the enrollment user interface may collect a superset of the information needed for multiple services. Then, the first type of individual may specify or select one or more services, and the computer may use the superset of information to perform enrollment and/or establish accounts with the specified or selected one or more services. Alternatively, the first type of individual may perform the enrollment process for a first service using the enrollment user interface. Subsequently, the computer may use the information provided by the first type of individual to establish additional accounts for one or more additional services. In one or more of these ways, the enrollment process may be, at least in part, automated, thereby improving the user experience and fulfillment by making the enrollment user interface easier to use and by making the enrollment process faster.

Figure 3:
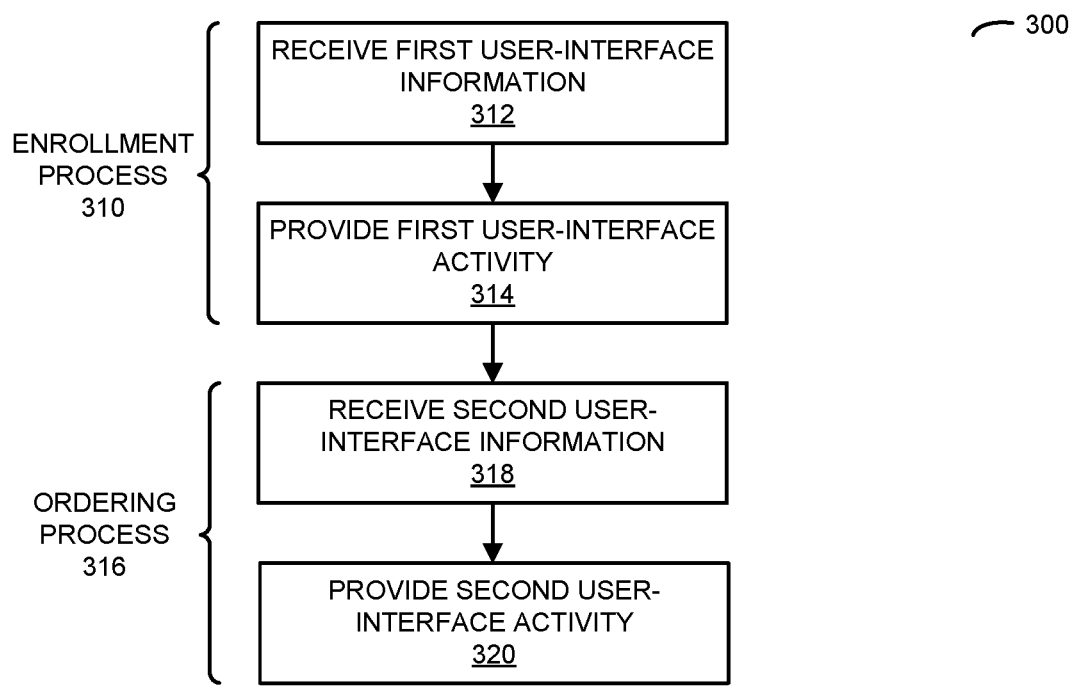
FIG. 3 is a flow diagram illustrating a method for performing an enrollment process and an ordering process using an electronic device in FIG. 1 in accordance with an embodiment of the present disclosure.

FIG. 3 presents embodiments of a flow diagram illustrating an example of a method 300 for performing an enrollment process 310 and ordering process 316, which may be performed by one or more electronic devices (such as electronic device 110-1 and/or 110-2 in FIG. 1). During operation, a first electronic device may perform an enrollment process. In particular, the first electronic device may receive the first user-interface information (operation 312) associated with the computer that specifies the enrollment user interface associated with the first individual characteristics. Then, the first electronic device may provide the first user-interface activity (operation 314) for the computer that specifies the enrollment information for the service.

Subsequently, a second electronic device (which may be the same as or different from the first electronic device) may perform the ordering process. In particular, the second electronic device may receive the second user-interface information (operation 318) associated with the computer that specifies the service user interface associated with the second individual characteristics. Next, the second electronic device may provide the second user-interface activity (operation 320) for the computer that specifies the request for the instance of the service.

In some embodiments of methods 200 and/or 300 (FIG. 3) there may be additional or fewer operations. Moreover, the order of the operations may be changed, and/or two or more operations may be combined into a single operation or performed at least partially in parallel.

Figure 4:
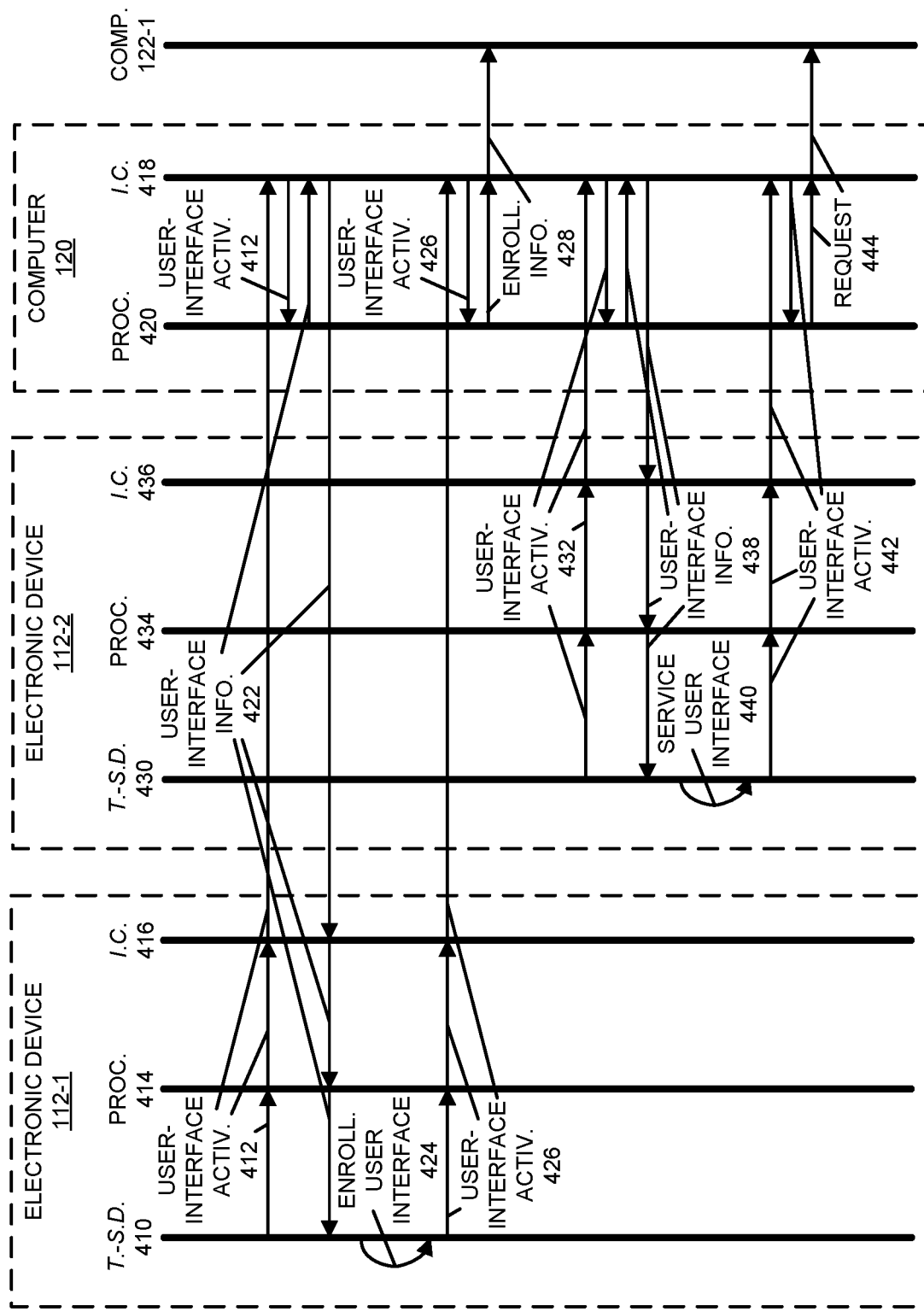
FIG. 4 is a drawing illustrating communication between a computer and electronic devices in FIG. 1 in accordance with an embodiment of the present disclosure.

The access techniques are further illustrated in FIG. 4, which presents a flow diagram illustrating an example of communication between electronic device 110-1, electronic device 110-2, computer 120 and computer 122-1. In particular, a first individual using electronic device 110-1 may activate a virtual icon on a touch-sensitive display 410 in electronic device 110-1 (such as a virtual icon that requests an enrollment process or application for one or more services), which may provide user-interface activity 412 that specifies this selection to processor 414. In turn, processor 414 may provide user-interface activity 412 to interface circuit (I.C.) 416, which may provide user-interface activity 412 to computer 120.

After receiving user-interface activity 412, interface circuit 418 in computer 120 may provide user-interface activity 412 to processor 420. In response, processor 420, which may be executing an enrollment module, may provide user-interface information 422 that specifies an enrollment user interface 424 associated with first individual characteristics. Then, interface circuit 418 may provide user-interface information 422 to electronic device 110-1.

After receiving user-interface information 422, interface circuit 416 may provide user-interface information 422 to processor 414, which then may provide user-interface information 422 to touch-sensitive display 410. Next, touch-sensitive display 410 may display enrollment user interface 424. Moreover, the first individual may interact with enrollment user interface 424 (such as activating one or more virtual icons, radial buttons, text entry boxes, user-interface features, etc.). This user-interface activity 426 may specify enrollment information 428 for a service. Furthermore, touch-sensitive display 410 may provide user-interface activity 426 that includes or specifies enrollment information 428 to processor 414, which may provide user-interface activity 426 to interface circuit 416, which may provide user-interface activity 426 to computer 120.

After receiving user-interface activity 426, interface circuit 418 may provide user-interface activity 426 to processor 420. Based on enrollment information 428, processor 420 may provide enrollment information 428 to interface circuit 418, which may provide enrollment information 428 to a computer 122-1 that is associated with the service. In particular, computer 122-1 may use enrollment information 428 to establish an account for the service.

Subsequently, a second individual of electronic device 110-2 may activate a virtual icon on a touch-sensitive display 430 in electronic device 110-2 (such as a virtual icon that requests an ordering process or application for one or more services), which may provide user-interface activity 432 that specifies this selection to processor 434. In turn, processor 434 may provide user-interface activity 432 to interface circuit 436, which may provide user-interface activity 412 to computer 120.

After receiving user-interface activity 432, interface circuit 418 may provide user-interface activity 432 to processor 420. In response, processor 420, which may be executing an ordering module, may provide user-interface information 438 that specifies a service user interface 440 associated with second individual characteristics. Then, interface circuit 418 may provide user-interface information 438 to electronic device 110-2.

After receiving user-interface information 438, interface circuit 436 may provide user-interface information 438 to processor 434, which then may provide user-interface information 438 to touch-sensitive display 430. Next, touch-sensitive display 430 may display service user interface 440. Moreover, the second individual may interact with service user interface 440 (such as activating one or more virtual icons, radial buttons, text entry boxes, user-interface features, etc.). This user-interface activity 442 may specifies request 444 for an instance of the service. Furthermore, touch-sensitive display 430 may provide user-interface activity 442 that includes or specifies request 444 to processor 434, which may provide user-interface activity 442 to interface circuit 436, which may provide user-interface activity 442 to computer 120.

After receiving user-interface activity 442, interface circuit 418 may provide user-interface activity 442 to processor 420. Based on request 444, processor 420 may provide request 444 to interface circuit 418, which may provide request 444 to computer 122-1 that is associated with the service. In particular, computer 122-1 may use request 444 to provide the instance the service to the second individual based on the account established using enrollment information 428.

Figure 5:
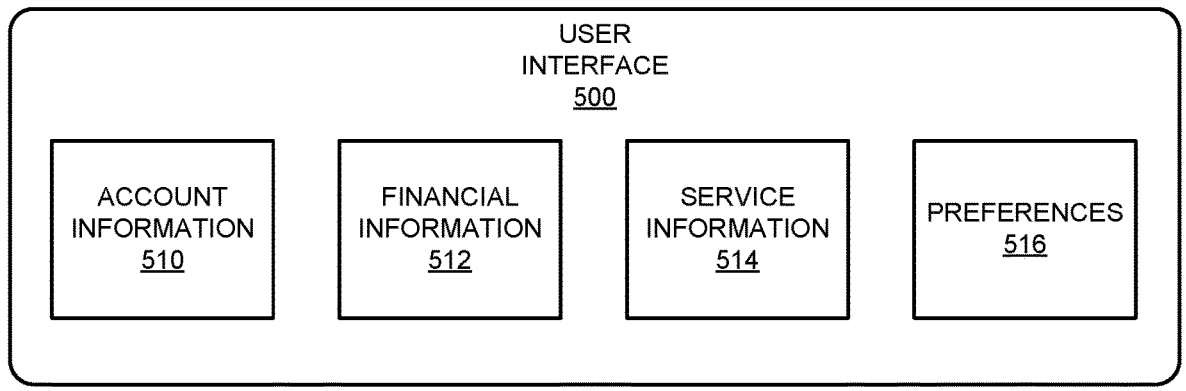
FIG. 5 is a drawing illustrating an enrollment user interface in accordance with an embodiment of the present disclosure.

In some embodiments, the access techniques are used to provide different user interfaces for different types of users. FIG. 5 presents a drawing illustrating an example of an enrollment user interface 500, which may be provided by computer 120 (FIG. 1). This user interface may include fields that allow a first individual or a first type of individual having first individual characteristics to specify or select: account information 510, financial information 512, service information 514, and/or preferences 516. Note that account information 510 may include account credentials, such as a username and a password. Moreover, financial information 512 may include credit-card or debit-card information. Furthermore, service information 514 may include a type of service, one or more addresses where the service is to be provided, and details of the service that is to be provided. For example, the first individual may use enrollment user interface 500 to set up an account with a third-party service provider for the service. In addition, the first individual may use enrollment user interface 500 to predefine details of the service, such as transportation from a first location to a second location at a particular time of day on a particular day or on an ongoing basis, etc. In some embodiments, preferences 516 includes: usability settings, privacy, and/or service-usage constraints.

Figure 6:
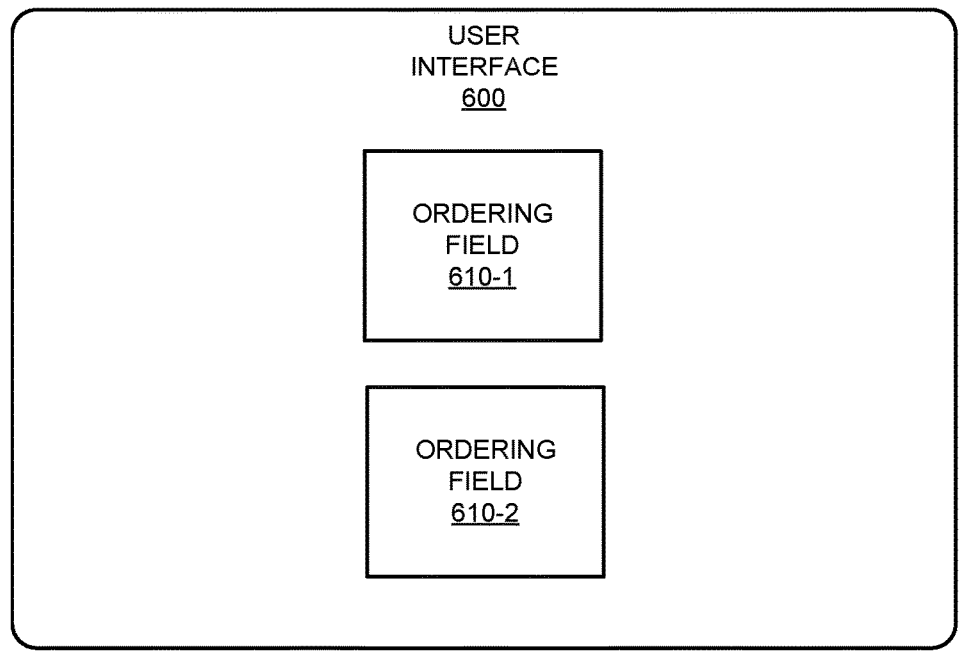
FIG. 6 is a drawing illustrating a service user interface in accordance with an embodiment of the present disclosure.

FIG. 6 presents a drawing illustrating an example of a service user interface 600, which may be provided by computer 120 (FIG. 1). This service user interface may include one or more ordering fields 610 that can be used by a second individual or a second type of individual having second individual characteristics to request an instance of the service. Relative enrollment user interface 500, service user interface 600 may second individual characteristics. In particular, service user interface may: have a larger font size (such as a font size that is greater than an age-dependent angular resolution of the second type of individual), avoid or reduce the use of blue hues or colors in text, provide subtitles for video or audio, have a slower refresh rate, have a longer timeout interval, display information closer to a center of a display, have a larger strike area associated with a virtual command icon based on hand jitter of the second type of individual, have different contrast, simplified inputs, simplified navigation, easier error recovery (such as an easy way to restore or recover a previous state of service user interface 600, a 'home' button or icon to return to a landing page, etc.), have special notifications, reminders or alarms, be easier to use, have increased icon sizes (such as at least 9.6 mm diagonally), have increased inter-icon spacing (such as icons that are at least 2 mm apart), include text information or clues to guide the second type individual in using service user interface 600, include progress feedback (such as visual clues regarding progress), avoid splitting tasks into multiple screens, include shortcuts to previous selections (such as a previous request for an instance of the service), avoid multitasking by the second type of individual, include acoustic information to guide the second type of individual in using service user interface 600, include another type of scaffolding to assist use by the second type of individual and/or not assume prior knowledge of user-interface features by the second type of individual. Note that service user interface 600 may be based on a learning style of the second type of individual. Alternatively, or additionally, service user interface 600 may be based on technical risk aversion of the second type of individual. More generally, the second type of individual may have different physical, mental and/or learning capabilities or preferences than the first type of individual, and the first individual characteristics and the second individual characteristics may, therefore, be defined relative to each other or may be have absolute values.

Note that the individual characteristics may be predefined for a particular electronic device (such as during the enrollment process). Thus, subsequently, computer 120 (FIG. 1) may identify the individual characteristics associated with a particular electronic device based on an identifier of the electronic device (such as based on a MAC address or an IP address). Alternatively, or additionally, the individual characteristics may be specified or selected by a given individual that uses or that is associated with a particular electronic device during a given session. In some embodiments, the individual characteristics are automatically determined by a given electronic device or computer 120 (FIG. 1), such as based on behaviors when an individual is using (or not using) features in a user interface or an application. Alternatively, or additionally, the individual characteristics may be automatically determined based on sensor data, such as: analysis of one or more images acquired by an imaging sensor (e.g., biometric identification, gate or stability analysis, ocular analysis of an individual's vision, determination of an individual's gaze or viewing direction, etc.), analysis of sound acquired by one or more microphones (e.g., voice recognition, age identification, etc.), analysis of data from a motion sensor (such as gate or stability analysis of data from a gyroscope, an accelerometer, etc.), analysis of behavior when an individual is using a given user interface (such as fine-motor control based on variation in a contact point relative to a strike area of a virtual icon on a touch-sensitive display), handwriting analysis, etc.

In some embodiments, the access techniques facilitate disparate convenience services using a common user interface associated with an access service associated with a provider. In the discussion that follows, a 'convenience service' may be understood to include services provided by a third party (who is different from the provider) to an individual. The individual or another individual may order an instance of an access service via a website or web page, or via an application (which is sometimes referred to as an 'ordering application') executing on an electronic device (such as a smartphone or a cellular telephone). This instance of the convenience service may be fulfilled by the third party at a physical location of the individual or the other individual (such as a specified physical location, which may be predefined or dynamic, e.g., based on a location of the electronic device). The convenience service may include: a vehicle-for-hire application, a ride-sharing application, a ride-hailing application, food delivery (such as from a restaurant), payment services, a grocery-delivery service, home healthcare, a gig or freelance-economy service, cleaning, delivery, handyman services, a service with a prespecified type of deliverable that is unchanged in different instances or occurrences of the service (such as transportation from a ride-hailing application, a grocery-delivery service, food delivery from a restaurant, etc.), another type of service, etc. Thus, the convenience services may encompass the services discussed previously. However, in some embodiments, a convenience service may be a subset of ecommerce or different from generic ecommerce or online shopping, where goods are purchased via the Internet and shipped to a specified delivery location, which may be different from a physical location of the individual.

As discussed previously, many convenience services are designed for use by customers that are technology savvy. Thus, an individual may order a meal from a restaurant that is delivered by a third party (who may be different from the individual, the restaurant, the provider of the access service or a provider of a food-delivery-service application) in an instance of a convenience service. Alternatively, in another instance of a convenience service, the individual may order transportation to an airport, which may be fulfilled by a third party that drives to the individual's physical location (such as their home address), and then transports the individual to the airport.

In principle, the individual that orders these instances of the services may be fully capable of performing these tasks or services by themself. Thus, the individual may be able to go to the restaurant to pick up take-out or may be able to drive to the airport in their car. Nonetheless, the individual may use these instances of the services that are fulfilled by third parties (such as so-called gig or freelance-economy workers) and which may be facilitated by aggregators, which are typically separate providers that facilitate marketplaces (and associated ordering applications for the electronic device) between the individuals and the gig-economy workers for different types of services. Consequently, the services are referred to as 'convenience services.'

However, other individuals may not be readily capable or able to perform the tasks or services that are involved in the instances of the convenience services. For example, another individual may not be technically savvy or may be physically or cognitively less capable as the individual (either temporarily or permanently). These differences with the individual may extend to other aspects of the other individual's life. Thus, the other individual may be, e.g., a senior citizen, who is less mobile than the individual, and who may benefit from having access to the convenience services. Consequently, the convenience services may, in fact, be essential services for the other individuals. Nonetheless, because of the aforementioned constraints (technical skill, physical limitations, cognitive limitations, etc.), the other individuals may have difficulty or may not be able to enroll and order instances of the convenience services.

A family member, friend or a care provider may be able to guide another individual through the enrollment process and the ordering process for an instance of a convenience service. However, this level of support is typically only effective or successful if the family member, friend or care provider is at the same physical location as the other individual, so they can guide them, step by step, through the enrollment process and the ordering process for an instance of a convenience service. This approach may not an option or may be much less effective when the family member, friend or care provider is at a different physical location, such as a physical location that is geographically distant from the other individual. For example, an adult child may be able to help their parent use a food-delivery service when they are physically present with their parent. Even with this level of direct support, the parent may have trouble or difficulty when they attempt to use the food-delivery service again if their adult child is not physically present to guide them, correct errors or answer any questions they may have.

In order to address these challenges and to facilitate increased use of convenience services, in some embodiments a provider of the access techniques may offer a service with a common user interface. This service may be provided by a remote computer that is accessed via a network (such as the Internet), e.g., via a website or web page. Thus, the service may be an online service. Alternatively or additionally, the service may, at least in part, be provided by an application that is installed and that executes on a local computer or an electronic device (such as a cellular telephone or a personal computer).

Notably, the local or remote computer may provide a user interface that allows an individual (who is sometimes referred to as a 'first individual' or an 'administrator') to provide enrollment information for a convenience service. For example, the enrollment information may include: contact information for the individual, contact information for another individual, a username, a password, a physical location where instances of the convenience service are fulfilled, payment information (such as credit-card information), user preferences for how the convenience service is fulfilled, constraints on the convenience service (such as a frequency of use, restrictions on changes to the convenience service, e.g., that substitutions may not be allowed, allergies or a medical condition or information that is relevant to a convenience service, a predefined schedule of ongoing instances of the convenience service, enabling notifications or alerts when the convenience service is used or when there is a problem with the convenience service, etc.), and/or another type of enrollment information.

Then, the computer may communicate with another computer or server associated with a provider of the convenience service. During this communication, the computer may establish or set up an account. This account may be for the individual. Alternatively, the individual may set up the account for another individual (who is sometimes referred to as a 'second individual'). When setting up the account, the computer may reformat the enrollment information based at least in part on the enrollment user interface for the convenience service. This reformatting may include automatically filling in or completing fields in the enrollment user interface for the convenience service.

In some embodiments, the local or remote computer may use the enrollment information to establish or set up accounts with multiple different providers of convenience services (which may include two or more instances of the same type of service and/or different or disparate types of services). During this set-up process, the local or remote computer may communicate with multiple other computers or servers associated with the different providers. Moreover, the local or remote computer may reformat the enrollment information based at least in part on the enrollment user interfaces for the convenience services. This reformatting may include automatically filling in or completing different fields in different enrollment user interfaces for the convenience services. Thus, in some embodiments, the user interface provided by the local or remote computer may be a common user interface for enrollment with multiple convenience services from different providers.

While the preceding discussion illustrated the use of the user interface in the enrollment process for one or more convenience services, more generally the user interface may provide a portal for the one or more convenience services. Thus, the user interface may provide abstract and intermediate information exchange with one or more user interfaces for the one or more convenience services (and, more generally, one or more application programming interfaces for the one or more convenience services). Therefore, as discussed further below, the user interface (and, thus, the local or remote computer) may be used in an ordering process for one or more instances of the one or more convenience services. Moreover, while the preceding discussion illustrated the use of the user interface in the enrollment process to set up one or more accounts of one or more providers of convenience services, in other embodiments the user interface may be used provide the ordering information without the enrollment process (and, thus, with out setting up the one or more accounts). In these embodiments, the ordering information may include at least some of the enrollment information (such as the physical location where instances of the convenience service are fulfilled, the payment information, etc.).

Notably, after the enrollment with the one or more providers is completed (and one or more accounts have been set up for the individual or the other individual), the access techniques may allow instances of one or more convenience services to be ordered by the individual or the other individual. For example, the local or remote computer may provide the user interface or another user interface that allows the individual to provide ordering information for an instance of the convenience service from a provider. Note that the ordering information may include: the physical location where the instance of the convenience service is provided or fulfilled (such as a pick-up location and/or a drop-off or destination for a ride-hailing application), a type of service, ordered goods or services, a time when the instance of the convenience service is to be provided or fulfilled, payment information, a tip amount, and/or another type of ordering information. This instance of the convenience service may be delivered or fulfilled at the physical location of the individual or the other individual. Thus, the individual may order a pickup by a driver associated with a ride-hailing application at the home address of the other individual. Alternatively, the other individual may use the user interface or the other user interface to provide the ordering information for the instance of the convenience service from the provider, and the instance of the convenience service may be delivered or fulfilled at the physical location of the other individual. Thus, in embodiments where the individual sets up one or more accounts for the other individual with one or more providers during the enrollment process, the other individual may then use the user interface or the other user interface to order one or more instances of a convenience service (which may leverage account information associated with the one or more accounts).

Furthermore, in some embodiments, the local or remote computer may be used to order instances of convenience services from multiple different providers of convenience services (which may include two or more instances of the same type of service and/or different or disparate types of services). During this ordering process, the local or remote computer may communicate with multiple other computers or servers associated with the different providers. Moreover, the local or remote computer may reformat the ordering information based at least in part on the ordering user interfaces for the convenience services. This reformatting may include automatically filling in or completing different fields in different ordering user interfaces for the convenience services. Thus, in some embodiments, the user interface or the other user interface provided by the local or remote computer may be a common user interface for ordering multiple convenience services from different providers.

Additionally, in some embodiments, the local or the remote computer may assist the individual or the other individual in understanding how to use the user interface during the enrollment process, and/or how to use the user interface or the other user interface during the ordering process for one or more instances of one or more convenience services. For example, the user interface or the other user interface may include teaching modules.

Moreover, the local or the remote computer may monitor the use of the user interface, the other user interface, and/or one or more convenience services. This capability may allow the local or the remote computer to detect occurrence of a problem and, when a problem occurs, to perform a remedial action (and, more generally, to intervene as needed). For example, the local or the remote computer may automatically provide a suggestion or a correction for an identified error in the ordering process for an instance of a convenience service. Thus, the local or the remote computer may automatically modify the provided ordering information (such as based at least in part on default values specified in the enrollment process, historical values of the ordering information from one or more previous instances of the convenience service, etc.). Furthermore, if the error or problem persists (i.e., if the remedial action is unsuccessful), the local or the remote computer may automatically connect the individual or the individual (or the local computer or electronic device) to a live help service, where a person will walk them through successful completion of the enrollment process and/or the ordering process for an instance of a convenience service.

Note that the remedial action may include: automatic correction of an error, intervention or assistance for the individual or the other individual, or providing or an alert (e.g., to the individual when the other individual is having a problem). Moreover, the assistance may not be confined to the enrollment process and/or the ordering process. For example, when the local computer or the remote computer detects a type of behavior that is different from historical behavior when ordering one or more instances of one or more convenience services (such as a frequency of use of a convenience service), the local computer may determine that the other individual needs assistance (even when the other individual is using the user interface or the other user interface in the ordering process correctly). Thus, in this example, the local computer or the remote computer may associate a high frequency of use of a convenience service as an indication that the other individual is lonely or depressed (and, more generally, has a different mood), and may alert or notification to the individual. Similarly, based at least in part on an unusually high rate of errors when using the user interface or the other user interface, the local computer or the remote computer may determine that the other individual is physically or cognitively unwell, and may provide an alert or notification to the individual.

In some embodiments, the problem may be with an instance a convenience service. For example, the other individual may be a parent and the individual may be their adult child. The parent may use the local computer or the remote computer to order an instance of a convenience service, such as a grocery-delivery service. Their order may include refrigerated pickles, and the enrollment information may specify that there should not be substitutions. Nonetheless, when they receive their order (the instance of the convenience service), they may receive nonrefrigerated pickles. As with many customers, the parent may be inclined to not say anything or complain, and to simply not use the grocery-delivery service in the future (i.e., the feedback may be in the form of a lost customer). When the local computer or the remote computer detects this error (e.g., based at least in part on image analysis of an image of the delivered groceries and/or analysis of an itemized invoice or list of delivered groceries), the remedial action may be to reject the invoice for this item or for the instance of the convenience service). Moreover, the local computer or the remote computer may provide information specifying the error to a provider of the convenience service and/or to reorder the correct item (e.g., in another instance of the convenience service). In these ways, the access techniques may automatically address the error and keep the other individual as a customer, both of the convenience service and the provider of the access techniques.

Note that the monitoring may detect an occurrence of an error using a pretrained machine-learning model and/or a pretrained neural network (such as a convolutional neural network, a recurrent neural network, deep learning, etc.). For example, the pretrained machine-learning model may be based at least in part on an unsupervised-learning technique (such as a clustering technique) and/or a supervised-learning technique. In some embodiments, the supervised-learning technique includes: linear regression, nonlinear regression, a support vector machine (SVM), least absolute shrinkage and selection operator (lasso) regression, ridge regression, a classification and regression tree (CART), a decision tree, logistic regression, a Bayesian analysis technique, a k-means or nearest neighbor technique, random forests, and/or another linear or nonlinear machine-learning technique. Moreover, in some embodiments, the monitoring may include image analysis using an image-analysis technique, such as one or more of: a predefined neural network, an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), simultaneous locations and mapping (SLAM), etc. In some embodiments, the image analysis includes a Kalman or Bayes filter technique, which may build a state model over previous image(s), such that the classification and analysis of objects in a scene is updated over multiple images in a sequence.

In some embodiments, the access service (and, more generally, the access techniques) allow multiple individuals to be included in a group that have different privileges for managing one or more accounts and ordering instances of convenience services. For example, as discussed previously, an individual (such as an adult child) may set up one or more accounts for another individual (such as their parent) with one or more providers of different convenience services. Then, once the relationship(s) have been established, one or more additional individuals (such as a sister or sibling of the individual) may be granted access and privileges. Notably, the individual may have an ownership or master role in a group of individuals that includes the other individual. The privileges of the individual may allow them to set up the one or more accounts (and, more generally, provide enrollment information) for the other individual, to provide ordering information for an instance of a given convenience service for the other individual, and/or to pay for the instance of the given convenience service for the other individual via an account of the other individual with a provider of the instance of the given convenience service. Moreover, the privileges of the other individual may allow them to provide ordering information for an instance of a given convenience service for themselves.

Furthermore, the privileges of the individual may allow them to selectively add an additional individual to the group. This additional individual may have different privileges in the group from those of the individual or the other individual. For example, the additional individual may be allowed to provide ordering information for an instance of a given convenience service for the other individual, and may be allowed to pay for the instance of the given convenience service for the other individual via an account of the other individual with a provider of the instance of the given convenience service. However, in contrast with the individual, the additional may not be allowed to change credentials (such as a password) for the account or to delete the account. Thus, in some embodiments, the access service may allow one or more individuals in a group to manage one or more accounts and ordering.

Additionally, in some embodiments, the group of individuals may include a 'virtual individual' or an intelligent agent. For example, the individual may allow an intelligent agent, which is implemented by the local computer and/or the remote computer, to join the group and to use machine learning and/or a neural network to anticipate or pre-empt issues or problems, and as needed to perform remedial action. Thus, an intelligent agent may be included in the group with privileges to assist the other individual in correctly providing the ordering information for a given instance of a convenience service, such as by automatically suggesting the ordering information or correcting an error in the ordering information. Alternatively or additionally, the intelligent agent may be allowed to anticipate needs of the other individual (such as based at least in part on a history of previous instances of convenience services) and to automatically provide ordering information for a given instance of a convenience service.

In some embodiments, the management capabilities of the access service may allow the privileges to be dynamically adjusted by, e.g., the individual. This may allow the privileges of the other individual to be changed, as a function of time, based at least in part on how the other individual is doing, such as mentally, physically and/or emotionally. This capability may allow the role of the other individual in the access service to be changed, as need. Thus, at some times, the other individual may be granted significant autonomy in placing orders for instances of convenience services. However, if the other individual is having trouble or difficulty (e.g., as evidence by an increased frequency of errors when using the access service), the individual may remove the ability of the other individual to provide ordering information or may require that ordering information provided by the other individual be remotely and electronically approved by the individual before it is submitted to a computer associated with a provider. This dynamic capability may allow the access system to flexibility and respectfully adjust to changes in the needs of, e.g., an elderly parent.

While the proceeding discussion illustrated the access service as being implemented by the local computer or the remote computer, in other embodiments the access service (and, more generally, the access techniques) may be implemented in a centralized or a distributed manner. Thus, in some embodiments, the access service (and, more generally, the access techniques) may be implemented may be implemented by the local computer (which may perform at least a subset of the aforementioned operations) and/or the remote computer (which may perform at least a remainder of the aforementioned operations).

Thus, the access techniques may allow the individual, who may be geographically removed or remote from the individual, to efficiently assist the other individual in accessing convenience services. Moreover, the access techniques may, on an ongoing basis, assist the individual and/or the other individual during the enrollment process and/or the ordering process by detecting errors and performing remedial action. Consequently, the access techniques may facilitate improved quality of service, customer satisfaction and retention.

We now describe embodiments of an electronic device. FIG. 7 presents a block diagram of an example of an electronic device 700 (which may be a cellular telephone, an access point, a base station, a computer or another electronic device, etc.). This electronic device includes processing subsystem 710, memory subsystem 712, and networking subsystem 714. Processing subsystem 710 includes one or more devices configured to perform computational operations. For example, processing subsystem 710 can include one or more microprocessors, application-specific integrated circuits (ASICs), microcontrollers, programmable-logic devices, graphical processing units and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), a read-only memory (ROM), flash memory, and/or other types of memory. In some embodiments, instructions for processing subsystem 710 in memory subsystem 712 include: one or more program modules or sets of instructions (such as program module 722 or operating system 724), which may be executed by processing subsystem 710. For example, a ROM can store programs, utilities or processes to be executed in a non-volatile manner, and DRAM can provide volatile data storage, and may store instructions related to the operation of electronic device 700. Note that the one or more computer programs may constitute a computer-program mechanism or software, and may be stored on a computer-readable storage medium. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710. In some embodiments, the one or more computer programs are distributed over a network-coupled computer system so that the one or more computer programs are stored and executed in a distributed manner. For example, some or all of the functions or operations performed by computer 120 (FIG. 1) may be implemented locally on an electronic device (such as electronic device 110-1 in FIG. 1) in an application or program module that is installed on and that executes in an operating environment of the electronic device. Moreover, some or all of the functions or operations performed by computer 120 (FIG. 1) may be implemented on a computer system or a group of electronic devices, which may be a single location or which may be geographically distributed.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718, a set of antennas 720 (or antenna elements) in an adaptive array that can be selectively turned on and/or off by control logic 716 to create a variety of optional antenna patterns or 'beam patterns,' and/or input/output (I/O) port 732. (While FIG. 7 includes set of antennas 720, in some embodiments electronic device 700 includes one or more nodes, such as nodes 708, e.g., a pad, which can be coupled to set of antennas 720. Thus, electronic device 700 may or may not include set of antennas 720.) For example, networking subsystem 714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or frame frames and/or scanning for advertising frames transmitted by other electronic devices.

Within electronic device 700, processing subsystem 710, memory subsystem 712, and networking subsystem 714 are coupled together using bus 728 that facilitates data transfer between these components. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc. Display subsystem 726 may be controlled by processing subsystem 710 to display information to a user (e.g., information relating to a user interface or user-interface activity).

Electronic device 700 can also include a user-input subsystem 730 that allows a user of the electronic device 700 to interact with electronic device 700. For example, user-input subsystem 730 can take a variety of forms, such as: a button, keypad, dial, touch screen, audio input interface, visual/image capture input interface, input in the form of sensor data, etc.

Electronic device 700 can be (or can be included in) any electronic device with at least one network interface. For example, electronic device 700 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. For example, two or more components or subsystems in electronic device 700 may be implemented on a single integrated circuit, such as processing subsystem 710 and networking subsystem 714, which may be implemented using a system-on-chip integrated circuit. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714. This integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a cellular-telephone communication protocol, a Wi-Fi communication protocol and/or Ethernet as an illustrative example, in other embodiments a wide variety of communication protocols and, more generally, communication techniques may be used. Thus, the access techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the access techniques may be implemented using program module 722, operating system 724 (such as a driver for interface circuit 718) or in firmware in interface circuit 718. Alternatively, or additionally, at least some of the operations in the access techniques may be implemented in a physical layer, such as hardware in interface circuit 718.

While examples of numerical values are provided in the preceding discussion, in other embodiments different numerical values are used. Consequently, the numerical values provided are not intended to be limiting.

In some embodiments, a computer (such as computer 120 in FIG. 1) provides a single user interface that can be used for an enrollment process and an ordering process. This user interface may allow one or more individuals to enroll and to use different services from one or more third-party service providers. For example, the user interface may be associated with the first individual characteristics or the second individual characteristics. Thus, in some embodiments the enrollment process and the ordering process may be performed using a user interface that is associated with the first individual characteristics or the second individual characteristics, such as a single user interface that is 'senior friendly.'

Moreover, in some embodiments, a computer (such as computer 120 in FIG. 1) allows a first type of individual (such as a first individual having first individual characteristics) to mirror or duplicate enrollment information and/or configuration information associated with an account of the first type of individual for an account of a second type of individual (such as an account for a second individual with a provider of the access techniques), which may allow one or more individuals to enroll and to use different services from one or more service providers. For example, after the mirroring or duplication, the second individual may use the service user interface or the single user interface to perform the ordering process.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with an electronic device associated with an individual and second computers associated with providers of different conveniences services;
a processor coupled to the interface circuit;
memory, coupled to the processor, storing program instructions, wherein, when executed by the processor, the program instructions cause the computer to perform one or more operations comprising:
receiving, via an access service having a common user interface for the convenience services, ordering information for an instance of a given convenience service in the convenience services, wherein the given convenience service comprises a prespecified type of deliverable that is unchanged in different instances or occurrences of the given convenience service,
wherein the given convenience service is intended for the individual and comprises providing the prespecified type of deliverable at a physical location of the individual, and
wherein a given provider of the given convenience service is different from a provider of the access service;
modifying the ordering information based at least in part on a predefined format;
providing the modified ordering information addressed to a given second computer in the second computers, wherein the modified ordering information is provided via an application programming interface having the predefined format and associated with the given convenience service; and
wherein providing the modified ordering information orders the instance of the given convenience service; and
dynamically adjusting privileges of the individual to provide a subsequent instance of ordering information for one of the convenience services based at least in part on a frequency of errors associated with at least the ordering information for the instance of the given convenience service, wherein the adjusted privileges require approval of the subsequent instance of ordering information associated with a second individual who is different from the individual.

2. The computer of claim 1, wherein the ordering information is associated with or comprises a source address of the electronic device.

3. The computer of claim 1, wherein the interface circuit is configured to communicate with a second electronic device associated with the second individual;
and
wherein the operations comprise:
receiving enrollment information associated with or comprising a source address of the second electronic device; and
establishing accounts associated with the individual and for the convenience services based at least in part on the enrollment information, wherein establishing a given account comprises communicating the enrollment information addressed to the given second computer in the second computers.

4. The computer of claim 3, wherein the enrollment information is received via a second common user interface for the convenience services;
wherein the establishing the given account comprises modifying the enrollment information based at least in part on a second predefined format; and
wherein communicating the enrollment information comprises providing the modified enrollment information via a second application programming interface having the second predefined format and associated with the given convenience service.

5. The computer of claim 4, wherein the second common user interface is different from the common user interface.

6. The computer of claim 3, wherein the ordering information is associated with or comprises a source address of the second electronic device.

7. The computer of claim 3, wherein the enrollment information specifies or defined the physical location where the convenience services are provided or fulfilled.

8. The computer of claim 1, wherein the operations comprise:
monitoring the ordering information, the instance of the given convenience service, or both; and
when a type of event is detected based at least in part on the monitoring, performing a remedial action.

9. The computer of claim 8, wherein type of event comprises an error in the ordering information, the instance of the given convenience service, or both; and
wherein the remedial action comprises providing a notification about the error addressed to a second electronic device associated with the second individual.

10. The computer of claim 8, wherein type of event comprises a physical, mental or emotional state of the individual; and
wherein the remedial action comprises providing a notification about the type of event addressed to a second electronic device associated with the second individual.

11. The computer of claim 8, wherein the monitoring is based at least in part on a history of instances of convenience services associated with the individual.

12. The computer of claim 11, wherein the history comprises a frequency of instances of the given convenience service.

13. The computer of claim 8, wherein type of event comprises an error in the instance of the given convenience service; and
wherein the remedial action comprises one or more of: automatically rejecting payment for at least a portion of the instance of the given convenience service; or correcting the error by providing second ordering information addressed to the given second computer for a subsequent instance of the given convenience service.

14. The computer of claim 1, wherein a group of two or more individuals have privileges for managing ordering instances of the convenience services by the individual;
wherein the group of two or more individuals comprises the second individual and excludes the individual; and
wherein the second individual has master privileges that allow the second individual to set up one or more accounts for the individual and to pay for instances of the conveniences services ordered by the individual.

15. A non-transitory computer-readable storage medium for use in conjunction with a computer, the computer-readable storage medium storing program instructions, wherein, when executed by the computer, the program instructions cause the computer to perform operations comprising:
receiving, via an access service having a common user interface for different convenience services associated with providers, ordering information for an instance of a given convenience service in the convenience services, wherein the given convenience service comprises a prespecified type of deliverable that is unchanged in different instances or occurrences of the given convenience service,
wherein the given convenience service is intended for an individual and comprises providing the prespecified type of deliverable at a physical location of the individual, and
wherein a given provider of the given convenience service is different from a provider of the access service;
modifying the ordering information based at least in part on a predefined format;
providing the modified ordering information addressed to a given second computer in second computers associated with the providers, wherein the modified ordering information is provided via an application programming interface having the predefined format and associated with the given convenience service; and
wherein providing the modified ordering information orders the instance of the given convenience service; and
dynamically adjusting privileges of the individual to provide a subsequent instance of ordering information for one of the convenience services based at least in part on a frequency of errors associated with at least the ordering information for the instance of the given convenience service, wherein the adjusted privileges require approval of the subsequent instance of ordering information associated with a second individual who is different from the individual.

16. The computer-readable storage medium of claim 15, wherein the ordering information is associated with or comprises a source address of an electronic device associated with the individual.

17. The computer-readable storage medium of claim 15, wherein the operations comprise:
receiving enrollment information associated with or comprising a source address of a second electronic device associated with the second individual; and
establishing accounts associated with the individual and for the convenience services based at least in part on the enrollment information, wherein establishing a given account comprises communicating the enrollment information addressed to the given second computer in the second computers.

18. The computer-readable storage medium of claim 17, wherein the enrollment information is received via a second common user interface for the convenience services;
wherein the establishing the given account comprises modifying the enrollment information based at least in part on a second predefined format; and
wherein communicating the enrollment information comprises providing the modified enrollment information via a second application programming interface having the second predefined format and associated with the given convenience service.

19. The computer-readable storage medium of claim 17, wherein the ordering information is associated with or comprises a source address of the second electronic device.

20. The computer-readable storage medium of claim 15, wherein the operations comprise:
monitoring the ordering information, the instance of the given convenience service, or both; and
when a type of event is detected based at least in part on the monitoring, performing a remedial action.

21. A method for ordering an instance of a given convenience service, the method comprising:
by a computer:
receiving, via an access service having a common user interface for different convenience services associated with providers, ordering information for the instance of the given convenience service in the convenience services, wherein the given convenience service comprises a prespecified type of deliverable that is unchanged in different instances or occurrences of the given convenience service,
wherein the given convenience service is intended for an individual and comprises providing the prespecified type of deliverable at a physical location of the individual, and
wherein a given provider of the given convenience service is different from a provider of the access service;
modifying the ordering information based at least in part on a predefined format;
providing the modified ordering information addressed to a given second computer in second computers associated with the providers, wherein the modified ordering information is provided via an application programming interface having the predefined format and associated with the given convenience service; and
wherein providing the modified ordering information orders the instance of the given convenience service; and
dynamically adjusting privileges of the individual to provide a subsequent instance of ordering information for one of the convenience services based at least in part on a frequency of errors associated with at least the ordering information for the instance of the given convenience service, wherein the adjusted privileges require approval of the subsequent instance of ordering information associated with a second individual who is different from the individual.

\* \* \* \* \*